DISTRIBUTING SYSTEM FOR TELEPHONE CALLS
Filed April 14, 1948
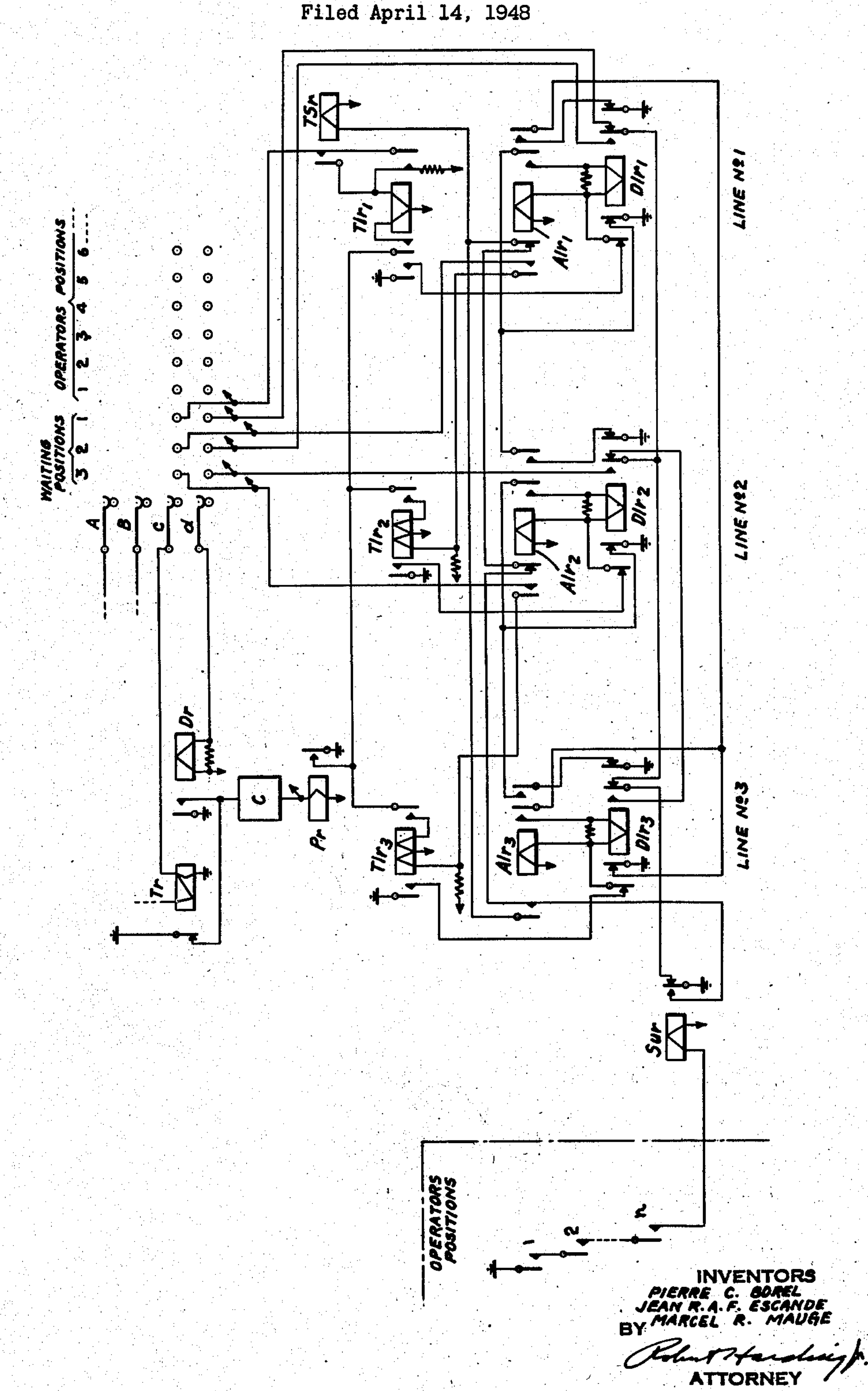
INVENTORS
PIERRE C. BOREL
JEAN R. A. F. ESCANDE
MARCEL R. MAUGE
BY Robert Harding Jr.
ATTORNEY Patented Nov. 11, 1952

2,617,889

UNITED STATES PATENT OFFICE 2,617,889

DISTRIBUTING SYSTEM FOR TELEPHONE CALLS

Pierre Charles Borel, Boulogne, and Jean Raymond Antoine Font Escande and Marcel Roger Mauge, Paris, France, assignors to International Standard Electric Corporation, New York, N. Y., a corporation of Delaware Application April 14, 1948, Serial No. 21,054
In France April 15, 1947

3 Claims. (Cl. 179—27)

The present invention relates to a system for distributing telephone calls in automatic or semi-automatic telephone exchanges.

In automatic telephony systems in which calls are directed to the operator's position by means of line finders associated with the incoming lines, it may happen that the line finders rotate continuously when all the operator's positions are busy.

In order to remedy this to some extent there have often been provided circuits in which the incoming calls are registered and which enable the line finders to resume rotation when one of the operator's positions is free. Such a device avoids unnecessary rotation of the line finders but does not distribute the calls in the same order in which they were received and it may happen that the last call received is given to the first free operator.

One object of the present invention resides in a distributing device which will distribute calls in relation to their chronological incoming order without keeping the line finders in rotation.

According to one feature of the present invention waiting positions are provided on the line finders associated with each line on which the calls accumulate in chronological order in the case of overload. When an operator is free the line finder which has been engaged by the first call received starts rotating.

Other features and advantages of the present invention will be apparent from the following description of an embodiment in relation with the drawing.

The figure of the drawing shows one of the line finders equipped with three waiting positions and any number of operators' positions. It is clear that the number of waiting positions can be changed without departing from the scope of the invention.

For the sake of clarity only the elements necessary to understand the invention have been shown in the drawing. Each waiting position comprises three relays A*lr*, D*lr*, T*lr*. Indicia 1, 2 or 3 denote relays corresponding to the first, second or third waiting line. The overloading of the operators' positions is indicated by the operation of relays TS*r* and SU*r*.

Relay SU*r* is controlled by a chain of contacts provided in the operators' position circuits, which are closed when the corresponding operator's position is engaged.

When all the operators' positions are busy, the chain of contacts controlling relay SU*r* is closed and this relay operates. On the other hand relay TS*r* operates by a make contact of SU*r* through the rest contacts of A$lr_2$ and AL$r_1$ and applies a test potential to the terminals of banks C of the finders. This test potential is given by a battery and a resistance in parallel with a winding of relay T*lr*. If a new call occurs the corresponding finder begins to rotate and finds the test potential through a front contact of TSR. Relay T*r* operates and finder C comes to rest. Over ground of relay TR, relay T$lr_1$ operates and locks independently of contact TS*r* and excites relay A$lr_1$ through back contact of D$lr_1$. When relay A$lr_1$ operates it opens the circuit of relay TS*r* which falls back and A$lr_1$ applies the test potential of the second waiting line to brush C of the row preceding line No. 1 already engaged. If a second call occurs a finder begins to rotate and stops on line No. 2; relay T*lr*2 operates over the test relay of the finder. Through front contact of T*lr*2, relay A*lr*2 operates and applies the test potential of the third waiting line to the corresponding terminals in the finder banks, thus putting the third waiting line in a position to receive a third overload call.

Two cases can be envisaged: (1) When the overload of the operating positions is temporary and only one call, for example, is waiting; (2) when the overload is permanent or at least is of sufficient duration to cause complete operation of the device.

If we now consider the first case in which a single call is waiting, relay T*lr*1 is locked and relay A*lr*1 is operated; as soon as an operator's position is free, the chain of contacts controlling the operation of SU*r* is open, and this relay falls back and closes the following circuit: contact of SU*r*, back contact D*lr*3, back contact of D*lr*2, back contact of D*lr*1, row *d* of finder C at rest on the first waiting line, relay D*r* which becomes energized and closes the circuit of finder C and of the pilot finger relay P*r*. Relay T*lr*1 remains locked through its second winding by front contact of relay P*r* which remains operated as long as any finder is hunting, while the line finder leaves the first waiting line and continues to rotate until it reaches the free operator's position. When this position is reached the line finder C stops and relay P*r* falls back. Relay T*lr*1 falls back in its turn and relay D*lr*1 operates in series with A*lr*1. The operation of D*lr*1 opens the locking circuit of A*lr*1 and, since relay A*lr*1 falls back more quickly relays D*lr*1 and A*lr*1 fall back and the device is now ready for another operation.

If we now take the case when the overload is permanent relays $Tlr$ operate one after the other according to the number of operator's positions made free. In this case for the first position available the first call leaves the first line, but relays $Tlr2$ and $Alr2$ being operated, relays $Alr1$ and $Dlr1$ lock themselves in series through a make contact of $Alr2$ and a break contact of $Dlr2$, when relay $Pr$ falls back, i. e. at the end of the search of the first call.

If a second operator's position is made free relay $SUr$ falls back and by the rest contacts of $Dlr3$ and $Dlr2$ and the make contact of $Dlr1$, the second call is pushed on. At the end of the search for this call, relays $Pr$ and $Tlr2$ fall back and relay $Dlr2$ locks itself thus causing relays $Alr1$ and $Dlr1$ to fall back. If the overload persists relay $TSr$ operates through the make contact of $Alr3$ and of $SUr$, thus enabling a new call to be put into waiting condition.

The present invention has been described in relation to an embodiment comprising three waiting lines. If there were more lines the same cycle of operation would occur until the overload is disposed of.

It is seen that in the embodiment described the calls are disposed of in the order in which they occurred without rotation of the associated line finders. To enable the circuit to record the order of occurrence of the calls even when the load is maximum, it is sufficient to provide enough waiting lines.

While we have described a particular embodiment of our invention for purposes of illustration it should be understood that various modifications and adaptations thereof may be made within the spirit of the invention as set forth in the appended claims.

What we claim is:

1. A telephone call distributing system comprising a line finder having a plurality of sets of terminals and cooperating brushes, a plurality of operator's positions, a group of said terminals being connected to said operator's positions and a second group of said terminals being waiting positions, driving means for said line finder, means initiated by an incoming call for causing the operation of said driving means to cause said line finder to hunt for a free operator's position, a contact at each operator's position adapted to be closed when said operator's position is busy, said contacts being connected in a chain circuit, a source of test potential, means for applying a test potential from said source to one of the terminals of said waiting positions, means connected to said chain circuit for operating said potential applying means when said contacts are all closed, means for stopping the operation of said driving means when the associated wiper of said line finder reaches the terminal thus marked with said test potential, and means under control of said last-mentioned operating means for starting the operation of said driving means again when one of said contacts is opened so as to cause said line finder to start hunting again for a free operator's position.

2. A telephone call distributing system, as defined in claim 1, in which there are a plurality of line finders with their terminals multiplied together, each line finder having its driving means and operating means therefor, and further comprising means for connecting a test potential to a terminal of a next succeeding waiting position when one of said line finders is resting on the preceding position, and the means for starting the operation of a line finder includes means for marking a terminal of the waiting position which has had a line finder resting on it for the longest period of time.

3. A telephone call distributing system, as defined in claim 2, in which the means for starting the operation of a line finder after it has rested on one of said waiting positions comprises a relay associated with the line finder and having its winding connected to the wiper engaging the terminal marked by the last mentioned marking means and having a contact controlling the driving means for said line finder.

PIERRE CHARLES BOREL.
JEAN RAYMOND ANTOINE FONT ESCANDE.
MARCEL ROGER MAUGE.

REFERENCES CITED

The following references are of record in the file of this patent:

UNITED STATES PATENTS

| Number | Name | Date |
|---|---|---|
| 1,623,336 | Dunbar | Apr. 5, 1927 |
| 1,711,744 | Ostline | May 7, 1929 |
| 2,176,340 | Hensler | Oct. 17, 1939 |
| 2,249,362 | Irvine | July 15, 1941 |
| 2,249,486 | Molnar | July 15, 1941 |